United States Patent [19]

Lüchinger

[11] Patent Number: 4,723,615
[45] Date of Patent: Feb. 9, 1988

[54] PRECISION BALANCE

[75] Inventor: Paul Lüchinger, Uster, Switzerland

[73] Assignee: Mettler Instrumente AG, Greifensee, Switzerland

[21] Appl. No.: 898,692

[22] Filed: Aug. 21, 1986

[30] Foreign Application Priority Data

Aug. 23, 1985 [CH] Switzerland ............ 3637/85

[51] Int. Cl.[4] .................. G01G 23/14; G01G 3/08
[52] U.S. Cl. ............................. 177/164; 177/229
[58] Field of Search ............... 177/168, 229, 255, 164

[56] References Cited

U.S. PATENT DOCUMENTS 3,847,238 11/1974 Hall et al. .................. 177/255
4,043,415 8/1985 Lüchinger .................. 177/255

FOREIGN PATENT DOCUMENTS 0131118 3/1985 European Pat. Off. .
8409629 7/1984 Fed. Rep. of Germany .
524879 8/1972 Switzerland .

Primary Examiner—George H. Miller, Jr.
Attorney, Agent, or Firm—Toren, McGeady & Associates

[57] ABSTRACT

A precision balance in which the fastening surface (56) for an upper guide arm (22) is fastened to a housing (42) which, by means of a pair of parallel levers (48,50) is vertically movable along the side wall (24) of the balance (18). The movement is effected by means of an adjusting element which engages in a conical slot (60) defined between the upper movable portion of the housing (42) and a bearing face (64) which is arranged immovable relative to the balance (18).

9 Claims, 7 Drawing Figures

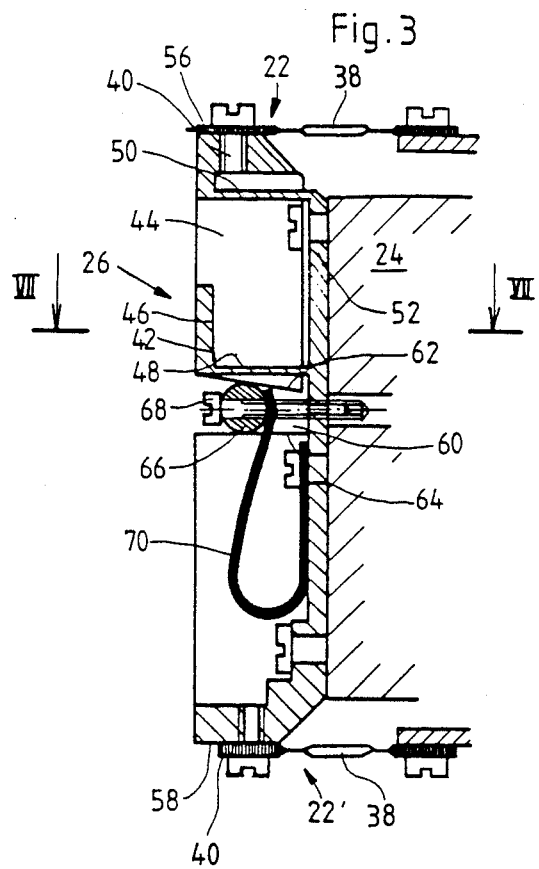
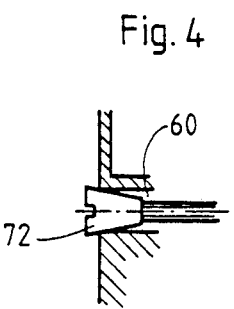
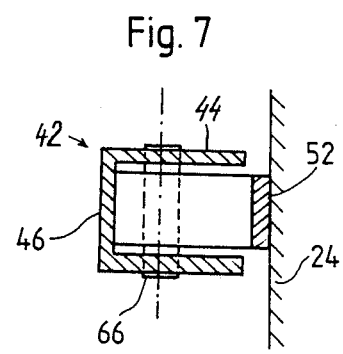
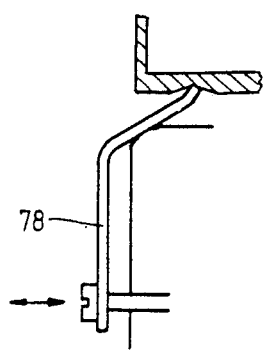
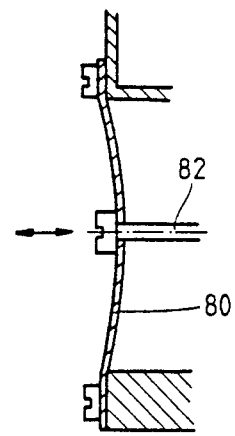

PRECISION BALANCE

BACKGROUND OF THE INVENTION

1. Field of the Invention

The present invention relates to a precision balance which includes a weighing dish supported by a support member. The support member is guided by means of guide arms in such a way that the weighing dish performs essentially only a vertical movement during weighing. The precision balance further includes an adjusting device for adjusting the vertical spacing between the ends of two guide arms.

2. Description of the Prior Art

It is known to those skilled in the art that in balances of this type it is very important to maintain the exact parallel alignment of the guide arms. It is particularly important to maintain the exact vertical spacing between the guide arm ends, so that weighing errors are avoided which could occur when the material to be weighed is not placed in the center of the weighing dish.

Swiss Pat. No. 524,869 discloses a precision balance with an adjusting device in which the vertically extending structure of the balance is recessed underneath the surfaces for fastening the guide arm ends, so that these surfaces can be moved to a slight extent by bending the structure by means of a screw.

The known balance permits a fine adjustment to a limited extent of the vertical spacing between the ends of the guide arms arranged one above the other. However, bending of the structure causes stresses within the balance and a change in the horizontal spacing between the two ends of the guide arms, which leads to transverse forces in the guide arms and in the recess portions. These transverse forces are undesirable because they may lead to additional measurement errors.

It is, therefore, the primary object of the present invention to provide a precision balance in which the adjustment of the spacing between the guide arms can be carried out within the entire adjustment range by means of a single adjustment element, wherein the surfaces for fastening the ends of the guide arms are shifted parallel to one another within the entire adjustment range.

It is another object of the invention to make it possible to effect from the outside under operating conditions, i.e., without removing any housing parts, an adjustment of the spacing for compensating for errors caused by loads placed on the corners of the weighing dish.

SUMMARY OF THE INVENTION

In accordance with the present invention, the adjustment device includes a pair of parallel levers which support a fastening surface for an end of a guide arm and is attached to the balance structure and has its own housing. The fastening surfaces can be raised and lowered with the housing without any change of the angle relative to the balance structure.

In the precision balance according to the invention, the guide arms arranged one above the other are aligned by a parallel shifting of the fastening surfaces for the ends of the guide arms with the housing at the pair of parallel levers on the balance structure. The swivel plane of the pair of parallel levers extends parallel to the swivel axis of the guide arms.

The balance according to the invention not only permits compensation of the deviations caused in manufacture and the inaccuracies caused during assembly, but bending stresses in the guide arms can be essentially avoided because the adjustment is effected without angular changes in the guide arms. Since the bending stresses are dependent upon the temperature due to the temperature coefficient of the modulus of elasticity, it is possible to keep very low the errors which are caused by external temperature changes. Consequently, the zero point is also much less dependent upon the temperature.

In accordance with a preferred embodiment of the present invention, the pair of parallel levers are mounted in their own housing. By inserting a cylinder into a conical slot provided below the upper half of the housing, the movement of the housing is infinitely adjustable within a distance range of, for example, ±0.3 mm with an accuracy of 0.5 μm.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawings:

FIG. 3 is a sectional view of an adjustment device which forms part of the precision balance;

FIGS. 4 through 6 are sectional views of an adjustment element; and

FIG. 7 is a sectional view along Line VII—VII of FIG. 3.

DETAILED DESCRIPTION OF THE INVENTION

Figure 1:
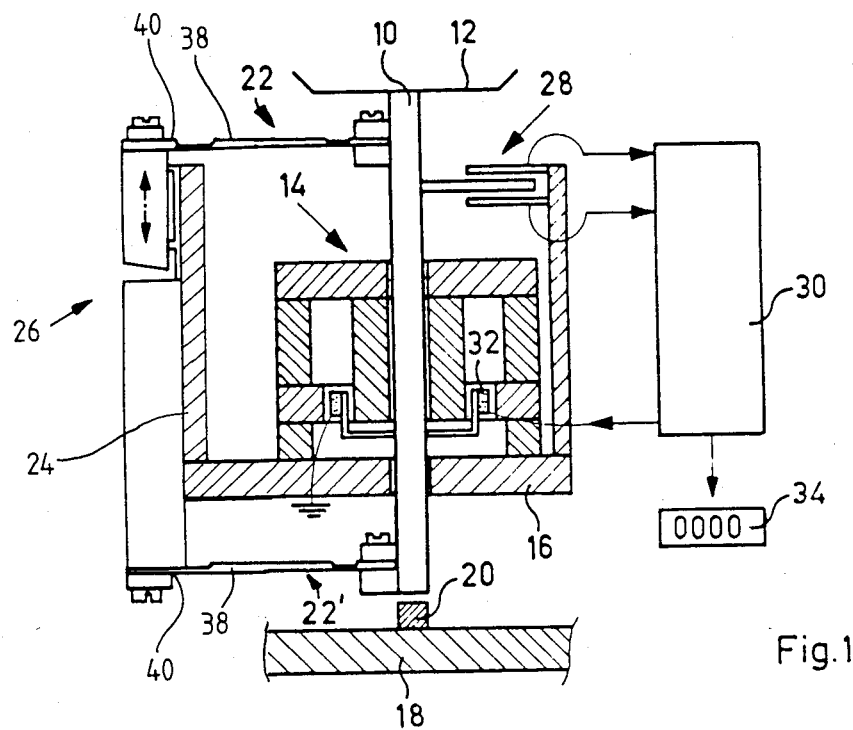
FIG. 1 is a schematic view of the precision balance according to the invention.

As illustrated in the drawing, the present invention is embodied in an electromagnetically compensating balance of the known type as disclosed, for example, in Swiss Pat. 591,072 because the advantages of the adjustment afforded in accordance with the present invention are particularly significant in balances of this or similar types in which the movable parts travel short distances.

The balance includes a vertically movable support member 10 to the upper end of which is attached a weighing dish 12. The support member 10 extends with play through a central bore of a permanent magnet system 14 which is stationary arranged on a cantilever 16 of balance structure 18. A stop 20 prevents impermissibly great deflections of support member 10.

Two guide arms 22, 22' having the shapes of triangles effect parallel guidance of support member 10. An adjusting device 26 indicated merely by a double arrow in FIG. 1 shall be explained in detail below.

The balance operates in the known manner as follows. When load is placed on the weighing dish 12, a capacitive sensor (position indicator) 28 signals a deflection of support member 10 from the normal position. This signal is utilized in an electric control circuit 30 for determining the magnitude of a current which flows through a compensating coil 32 arranged on support member 10. The electromagnetic force of this current in the gap defined by the permanent magnet system 14 returns support member 10 into the normal position. The magnitude of the compensating current in the state of equilibrium is a measure for the magnitude of the weight to be determined and can be displayed digitally in units per weight in a display device 34.

Figure 2:
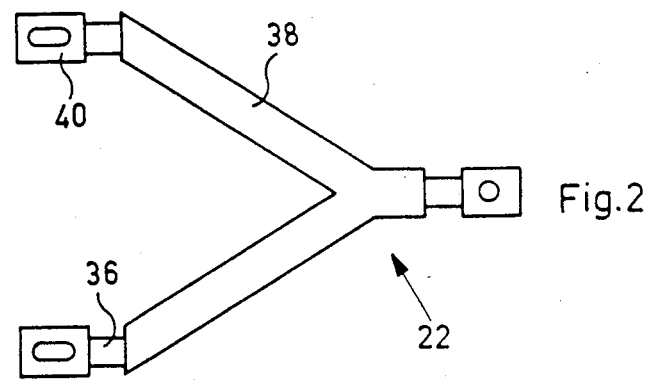
FIG. 2 is a top view of a guide arm.

A guide arm 22 is illustrated in FIG. 2. Guide arm 22 is constructed symmetrically and has three portions of reduced thickness and width relative to the original cross sectional area 38. The reduced portions are obtained by punching and grinding. The material is spring steel or spring bronze. At its ends 40, guide arm 22 has the original cross sectional area and is provided with oblong holes for effecting fastening by means of screws. The other, single end or "apex" of the triangle is intended for mounting on support member 10.

FIGS. 3 to 6 illustrate adjusting devices according to the present invention on a larger scale. The adjusting devices are attached to a part of the balance structure 18, for example, to a side wall 24, and they support the ends 40 of the upper guide arm 22.

The adjusting device 26 illustrated in the sectional elevational view of FIG. 3 is formed by a housing 42 whose upper portion is U-shaped and whose sides 44 extend perpendicular to side wall 24 and whose front portion 46 extends parallel to side wall 24. Housing 42 includes two plates which define a pair of parallel levers 48, 50 and whose ends are rigidly connected to front portion 46 and are connected to a rear wall 52. Rear wall 52 is arranged contiguous with side wall 24 and is rigidly connected therewith. The U-shaped portion of housing 42 is movable parallel relative to side wall 24 by means of the pair of parallel levers 48, 50. Front portion 46 is partially open, so that end 52 can be easily connected to side wall 24. Above the U-shaped portion of housing 42, the fastening surface 56 for the end 40 of guide arm 22 is attached to an extension of front portion 46. Fastening surface 56 is located exactly parallel to fastening surface 58 for the lower guide arm 22'. Guide arm 22' is provided on the lower portion of housing 42 which is rigidly connected to side wall 24 of balance structure 18.

The upper and lower portions of housing 42 are laterally separated from one another by a conically narrowing slot 60. The upper face of slot 60 forming support surface 62 extends inclined at an angle of about 4 degrees relative to lower face of slot 60 forming a support surface 64. A ground, cylindrical bolt 66 is placed in slot 60. The materials of the bolt 66 and of housing 42 preferably have the same coefficient of expansion. Bolt 66 is movable along support surface 64 by means of a screw 68 which extends transversely through bolt 66. Screw 68 is guided in housing 42 and/or in side wall 24. It is also possible to provide a differential screw whose coarser thread is guided in bolt 66 and whose finer thread is guided in housing 42 and/or in side wall 24. Bolt 66 is pressed in direction toward the wider portion of slot 60 by means of a plate spring 70. Instead of plate spring 70, it is also possible to utilize a helical spring surrounding screw 68.

The adjustment of the spacing between the fastening surfaces 56 and 58 is effected by turning screw 68 which moves bolt 66 within slot 60 until the upper portion of housing 42 and the fastening surface 56 are in the desired position.

As can be seen from FIG. 3, the shift of the fastening surface 56 is absolutely parallel, so that no bending forces can act on guide arm 22.

Instead of bolt 66 as the adjusting element, it is possible to use a conical screw 72 which serves to expand slot 60, as illustrated in FIG. 4. Screw 72 can be guided in the same manner as screw 68 discussed with respect to FIG. 3.

The adjusting element illustrated in FIG. 6 is a lever 78 which engages in slot 60 and whose swivel axis is located in or on support surface 64.

Instead of a short lever effecting the spreading, it is also possible to use a non-circular bolt (excentric) fastened to a long lever, not shown.

In the embodiment illustrated in FIG. 5, the two housing portions are connected to one another by means of a belt 80 and they can be moved toward one another by means of a screw 82 acting on the middle of the belt 80.

While specific embodiments of the invention have been shown and described in detail to illustrate the application of the inventive principles, it will be understood that the invention may be embodied otherwise without departing from such principles.

I claim:

1. A precision balance, comprising a support member, a weighing dish attached to said support member, said support member mounted in the balance so as to perform essentially exclusively a vertical movement during weighing, upper and lower guide arms attached to said support member, an adjusting device attached to the stationary balance structure, said adjusting device comprising a housing with a fastening surface, the end of one of said guide arms connected to said fastening surface, wherein said adjusting device acts to raise and lower said fastening surface without angular change thereof.

2. A precision balance according to claim 1, wherein said housing includes a rear wall, a U-shaped portion having sides and a front portion, and a pair of parallel levers each connected to said front portion and to said rear wall, said U-shaped portion having upper and lower ends, wherein said upper end defines said fastening surface, and said lower end forms a support face for an adjusting element.

3. A precision balance according to claim 2, wherein said pair of parallel levers is swivable in a plane which extends parallel to the plane in which said upper and lower guide arms are swivelled during weighing.

4. A precision balance according to claim 2, wherein said support face is inclined relative to said fastening surface, a bearing face arranged opposite of but not parallel with said support face, wherein said adjusting element is slidable in the slot defined between said support face and said bearing face.

5. A precision balance according to claim 4, wherein said adjusting element is a cylindrical bolt placed in said slot between said support face and said bearing face, wherein said bolt is slidable in said slot by means of a screw extending through said belt.

6. A precision balance according to claim 5, comprising a spring for pressing without play said bolt toward the wider opening of said slot.

7. A precision balance according to claims 2 or 3, comprising a bearing face arranged opposite said support face, said bearing face and said support face defining a space therebetween, wherein said adjusting element is a screw having a conical head, the end of said screw guided in a threaded portion, said screw acting to spread apart said space.

8. A precision balance according to claims 2 or 3, comprising a bearing face arranged opposite said support face, said bearing face and said support face defining a space therebetween, wherein said adjusting element is a tension belt extending across the outer end of said space.

9. A precision balance according to claims 2 or 3, comprising a bearing face arranged opposite said support face, said bearing face and said support face defining a space therebetween, wherein said adjusting element is a lever engaging in said space.

* * * * *